United States Patent
Marks et al.

(10) Patent No.: US 9,213,896 B2
(45) Date of Patent: Dec. 15, 2015

(54) METHOD FOR DETECTING AND TRACKING OBJECTS IN IMAGE SEQUENCES OF SCENES ACQUIRED BY A STATIONARY CAMERA

(71) Applicant: Mitsubishi Electric Research Laboratories, Inc., Cambridge, MA (US)

(72) Inventors: Tim K Marks, Newton, MA (US); Michael J Jones, Belmont, MA (US); Rohith MV, Newark, DE (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 304 days.

(21) Appl. No.: 13/785,010

(22) Filed: Mar. 5, 2013

(65) Prior Publication Data
US 2014/0254863 A1    Sep. 11, 2014

(51) Int. Cl.
*G06K 9/00* (2006.01)
*G06T 7/20* (2006.01)
*H04N 21/442* (2011.01)

(52) U.S. Cl.
CPC ........ *G06K 9/00624* (2013.01); *G06K 9/00771* (2013.01); *G06T 7/208* (2013.01); *G06K 2209/21* (2013.01); *G06T 7/2053* (2013.01); *G06T 2207/10024* (2013.01); *G06T 2207/20144* (2013.01); *G06T 2207/30196* (2013.01); *H04N 21/44218* (2013.01)

(58) Field of Classification Search
CPC ....... G06T 7/20; G06T 7/0081; G06T 7/0087; G06T 7/2053; G06T 2207/20144; G08B 13/19602; G08B 13/19604; G08B 13/19606; G05B 13/00; G05B 2219/37375; H05B 37/00; G06K 2209/21; G06K 9/38
See application file for complete search history.

(56) References Cited

U.S. PATENT DOCUMENTS

| | | | |
|---|---|---|---|
| 7,298,871 B2 * | 11/2007 | Lee et al. | 382/115 |
| 7,620,266 B2 * | 11/2009 | Brown et al. | 382/278 |
| 7,742,650 B2 * | 6/2010 | Xu et al. | 382/257 |
| 7,929,730 B2 | 4/2011 | Huang et al. | |
| 8,131,011 B2 | 3/2012 | Nevatia et al. | |
| 2003/0044045 A1 * | 3/2003 | Schoepflin et al. | 382/103 |
| 2008/0181499 A1 * | 7/2008 | Yang et al. | 382/174 |
| 2008/0273754 A1 * | 11/2008 | Hick et al. | 382/103 |
| 2009/0110236 A1 | 4/2009 | Huang | |
| 2010/0045799 A1 * | 2/2010 | Lei et al. | 348/169 |
| 2011/0216965 A1 * | 9/2011 | Rother et al. | 382/159 |
| 2013/0182905 A1 * | 7/2013 | Myers et al. | 382/103 |
| 2013/0184887 A1 * | 7/2013 | Ainsley et al. | 700/291 |

(Continued)

OTHER PUBLICATIONS

Gallego, et al. "Enhanced Foreground Segmentation and Tracking Combining Bayesian Background, Shadow and Foreground Modeling." Pattern Recognition Letters 33 (2012): 1558-568. Print.*

(Continued)

*Primary Examiner* — Michael A Newman
(74) *Attorney, Agent, or Firm* — Dirk Brinkman; Gene Vinokur

(57) ABSTRACT

In a sequence of images of a scene acquired by a stationary camera, objects are detected and tracked by determining a first set of candidate foreground regions according to a background model. A second set of candidate foreground regions is determined according to a set of foreground models. Then, candidate foreground regions in the first set and the second set are validated to produce a final set of foreground regions in the image that include the objects.

18 Claims, 2 Drawing Sheets

(56) References Cited

U.S. PATENT DOCUMENTS

2013/0336581 A1* 12/2013 Datta et al. .................. 382/165
2014/0314302 A1* 10/2014 Minato et al. ................ 382/141

OTHER PUBLICATIONS

Tian, et al. "Robust and Efficient Foreground Analysis in Complex Surveillance Videos." Machine Vision and Applications (2011): 1-24. Print.*
Stauffer, et al. "Learning Patterns of Activity using Real-Time Tracking." IEEE Transactions on Pattern Analysis and Machine Intelligence. 22.8 (2000): 747-757. Print.*
Tian, et al. "Robust Detection of Abandoned and Removed Objects in Complex Surveillance Videos." IEEE Transactions on Systems, Man and Cybernetics—Part C: Applications and Reviews 41.5 (2011): 565-76. Print.*
Wang, et al. "A Consensus-based Method for Tracking: Modelling Background Scenario and Foreground Appearance." Pattern Recognition 40 (2007): 1091-105. Print.*
Cheung, et al. "Robust Techniques for Background Subtraction in Urban Traffic Video." Advances in Neuro-Information Processing, LCNS 5507 (2009): 1-12. Print.*
Cucchiara, et al. "Detecting Moving Objects, Ghosts, and Shadows in Video Streams." IEEE Transactions on Pattern Analysis and Machine Intelligence 25.10 (2003): 1337-342. Print.*
Toyama, et al. "Wallflower: Principles and Practice of Background Maintenance." International Conference on Computer Vision (1999): 1-7. Print.*
Kulkarni, Ajay A. A Reactive Behavioral System for the Intelligent Room. MA thesis. MIT, 2002. Print.*
Tian et al. "Robust and Efficient Foreground Analysis in Complex Surveillance Videos." Machine Vision and Applications (2011): 1-24. Print.*
Stauffer et al. "Learning Patterns of Activity using Real-Time Tracking." IEEE Transactions on Pattern Analysis and Machine Intelligence. 22.8 (2000): 747-757. Print.*
Gallego et al. "Enhanced Foreground Segmentation and Tracking Combining Bayesian Background, Shadow and Foreground Modeling." Pattern Recognition Letters 33 (2012): 1558-568. Print.*
DPL-Surveillance Equipment "Thermostat Hidden Camera w/Built-In Digital Video Recorder." DPL Surveillance Equipment. Internet Archive, Feb. 14, 2011. Web. Feb. 22, 2015. <https://web.archive.org/web/20110214015633/http://www.dpl-surveillance-equipment.com/700002.html>.*
O. Barnich and M. Van Droogenbroeck. ViBe: A universal background subtraction algorithm for video sequences. In IEEE Transactions on Image Processing, 20(6):1709-1724, Jun. 2011.
C. Stauffer and W.E.L. Grimson. Adaptive background mixture models for real-time tracking. Proceedings of IEEE Computer Society Conference on Computer Vision and Pattern Recognition, 1999.
D. Comaniciu, V. Ramesh, and P. Meer. Kernel-based object tracking. IEEE Transactions on Pattern Analysis and Machine Intelligence, 25(5):564-577, 2003.
Y. Tian, A. Senior, and M. Lu. Robust and Efficient Foreground Analysis in Complex Surveillance Videos. Machine Vision and Applications, 2011.
David A. Ross, Jongwoo Lim, Ruei-Sung Lin, and Ming-Hsuan Yang. Incremental Learning for Robust Visual Tracking. International Journal of Computer Vision, 2008.
L. Taycher, J. Fisher III, and T. Darrell. Incorporating Object Tracking Feedback into Background Maintenance Imagework. Proceedings of the IEEE Workshop on Motion and Video Computing, 2005.
Helmut Grabner, Michael Grabner, and Horst Bischof. Real-Time Tracking via On-line Boosting. Proceedings of the British Machine Vision Conference, 2006.
K. Toyama, J. Krumm, B. Brumitt, and B. Meyers. "Wallflower: Principles and practice of background maintenance." Proceedings of the International Conference of Computer Vision, pp. 255-261, 1999.
Jaime Gallego et al. "Enhanced Foreground Segmentation and Tracking Combining Bayesian Background, shadow and Foreground Modeling," Pattern Recognition Letters, vol. 33, No. 12, Sep. 1, 2012.
Jaime Gallego et al. "Segmentation and Tracking of Static and Moving Objects in Video Surveillance Scenarios," Image Processing, 2008. ICIP. 15th IEEE International Conference, IEEE. Oct. 12, 2012.

* cited by examiner

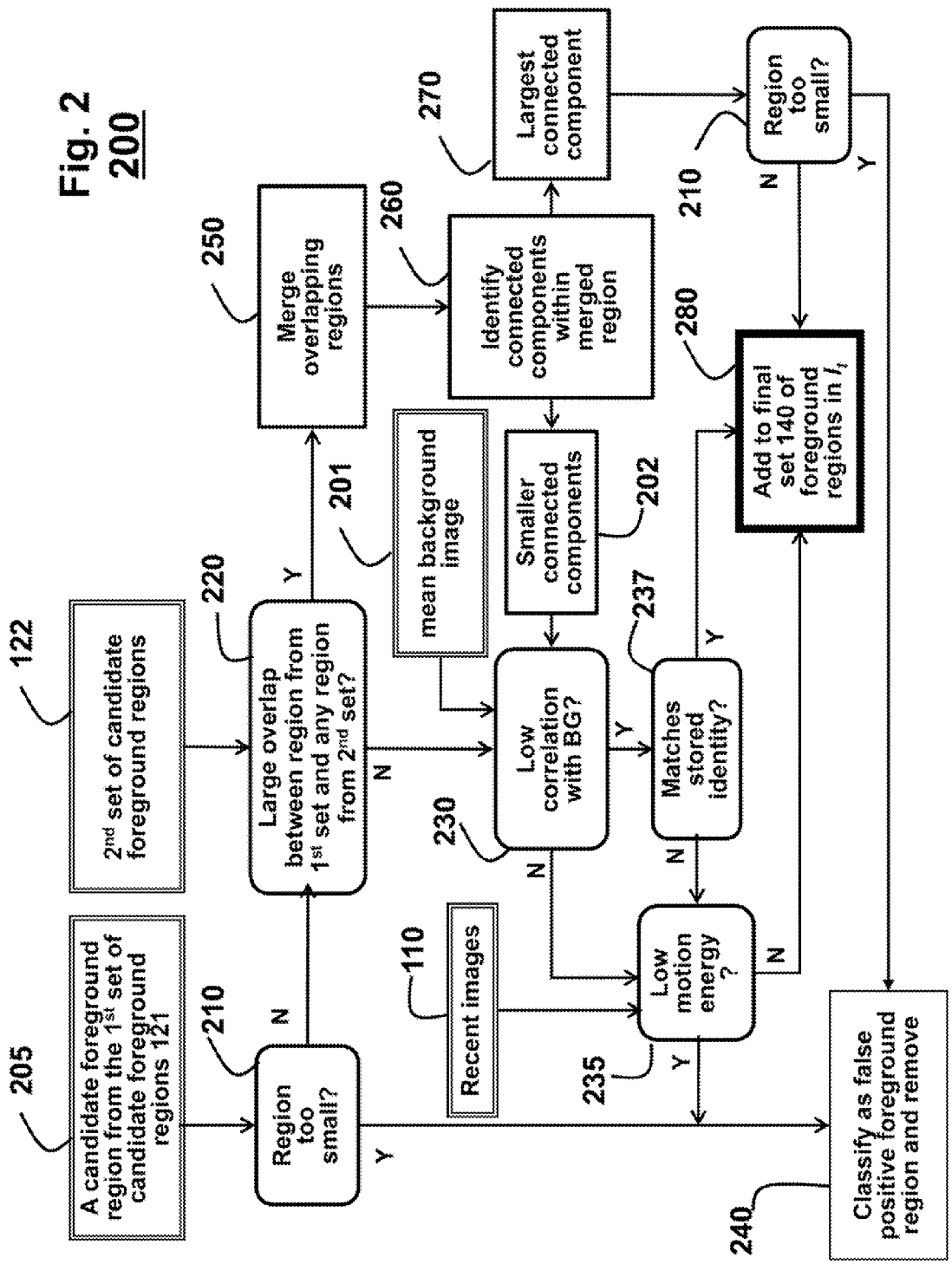

METHOD FOR DETECTING AND TRACKING OBJECTS IN IMAGE SEQUENCES OF SCENES ACQUIRED BY A STATIONARY CAMERA

FIELD OF THE INVENTION

This invention relates generally to computer vision, and more particularly to detecting and tracking objects in sequences of images of scenes acquired by stationary cameras.

BACKGROUND OF THE INVENTION

To track objects, such as people, in a sequence of images of a scene acquired by a camera, two main steps are generally required. The first step, usually referred to as detection, is to detect objects of interest in at least one image. The second step, usually referred to as tracking, is to associate objects that have been detected in or tracked in an image with candidate objects in a subsequent image. In some tracking, methods, these two steps are not separable.

One class of methods for object tracking uses a background model both to detect new objects and to track previously detected objects, without the use of a foreground model.

Another class of methods does not use a background model. For example, the method described in U.S. Pat. No. 8,131,011 uses a parts-based representation and can account for partial occlusion while tracking a person. To initialize a track, such methods either use a manually defined bounding box, or use an object detector such as a person detector, to identify a region in an image in the sequence that contains an object to be tracked. Person detectors are not very reliable in many scenarios, including indoor environments such as homes, due to a large range of poses, lighting conditions, and amounts of occlusion encountered. Furthermore, methods in this class are subject to drift, which means the tracking box tends to gradually move off of the foreground object onto a background region, after which the object is lost.

Some methods combine foreground detections based on a background model with a different method for tracking foreground objects, such as template tracking or mean-shift tracking. For example, U.S. Pat. No. 7,620,266 describes a tracking system that uses both foreground detections based on a background model, and tracking of foreground objects using a Kalman filter tracker. The tracker output is fed back to update the background model. However in that system, after a tracked region becomes stationary for a long enough time, the formerly tracked region becomes part of the background model, and the object is lost.

Another system uses a graphical model and belief propagation to combine results of the background model and an object tracker. After each image in a sequence is processed, the final foreground regions resulting from the combination are used to update both the background model and the object tracker.

In U.S. Pat. No. 7,620,266, the foreground tracking results from the current image, are not reflected in the output results from the current image. Instead, the foreground tracking results are used to update the background model to be used with future images. The output results for each image are based solely on the background model.

U.S. Pat. No. 7,929,730 discloses a method for detecting and tracking objects using spatio-temporal information that uses both background and foreground models.

SUMMARY OF THE INVENTION

The embodiments of the invention provide a method for detecting and tracking objects in a sequence of images of a scene acquired by a stationary camera that successfully handles many scenarios, such as indoor environments, in which prior art methods fail.

The method combines background and foreground modeling with foreground tracking, and provides an accurate set of foreground regions corresponding to objects. False positive regions, which can be caused by lighting changes, shadows, occlusions, small camera motions such as due to vibration, removed background objects, and left-behind background objects are removed by using a combination of one or more additional cues, such as object identity, object size, object motion energy, and correlation with a representative background image such as a mean background image.

BRIEF DESCRIPTION OF THE DRAWINGS

FIG. 2 is a flow diagram of a foreground region validator according to embodiments of the invention.

DETAILED DESCRIPTION OF THE PREFERRED EMBODIMENTS

Method Overview

Figure 1:
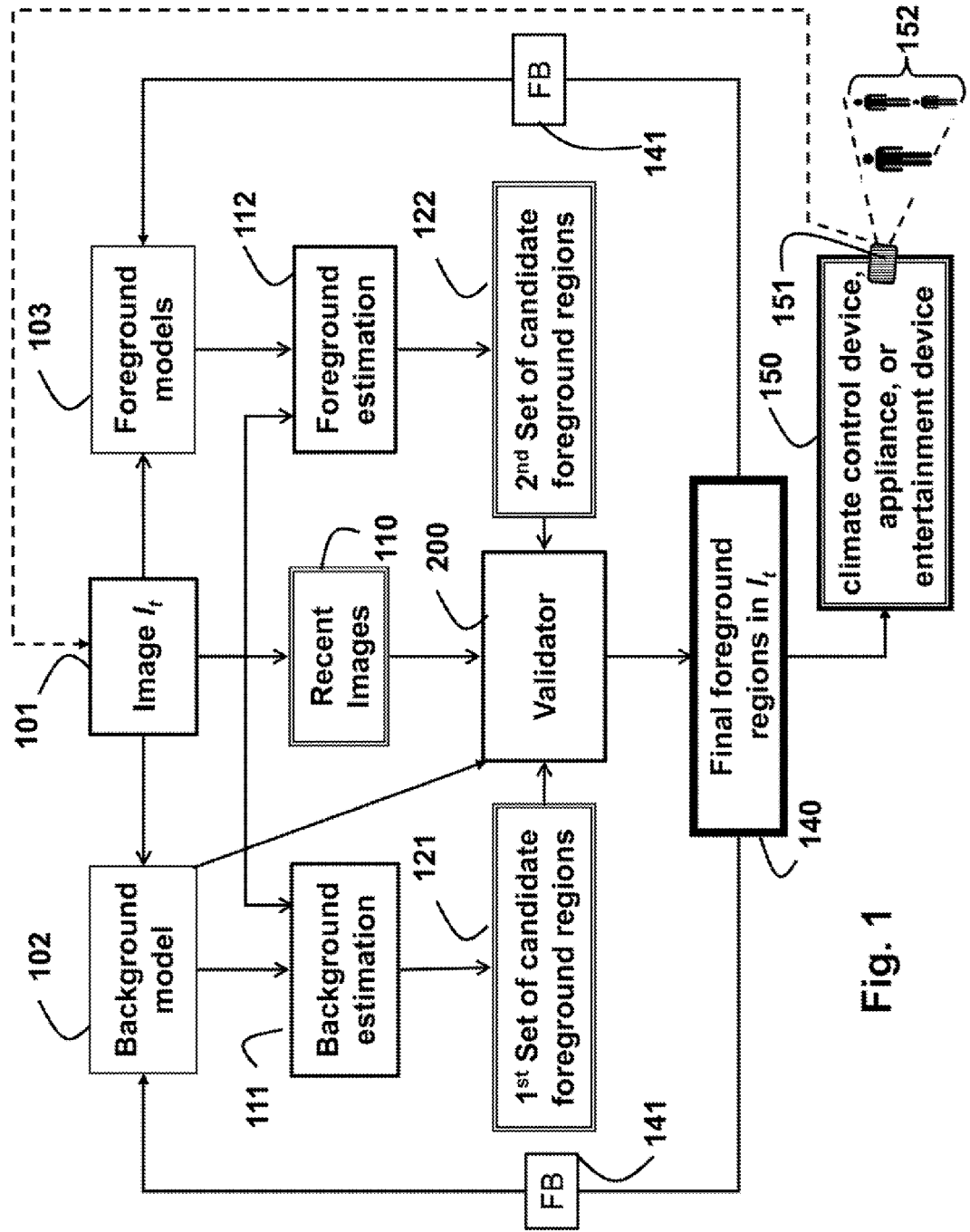
FIG. 1 is a flow diagram of a method for detecting and tracking objects in a sequence of images of a scene acquired by a stationary camera according to embodiments of the invention.

As shown in FIGS. 1 and 2, the embodiments of the invention provide a method for detecting and tracking objects, such as people, in a sequence of images of a scene acquired by a stationary camera. The camera can be located indoors, for example in a device 150 such as a climate control device (e.g. a room air-conditioner or heater), home appliance, or entertainment device (e.g., a television set). That way, the result of the detecting and tracking can be used to control the device with the camera or to control a different device located in the same environment. For example, the result of the tracking could be used to control the airflow of an air conditioning unit.

The method detects one or more moving objects in a field of view of the camera, and continues tracking the objects even when the objects subsequently remain motionless for a long time. The method is accurate even when the images are subject to changing lighting conditions, shadows, occlusions, small camera motions such as due to vibration, removed background objects, and left-behind objects.

As illustrated in FIG. 1, the method uses a set of foreground models 103 representing tracked objects and a background model 102 to detect objects in each image $I_t$ 101 in the sequence, where I is the time index of the current image. A buffer Stores k recent images (including the current image) 110 from the sequence, e.g. about ten.

Background estimation 111 and foreground estimation 112 are applied to each image 101 to determine a first set of candidate foreground regions 121, and a second set of candidate foreground regions 122, respectively. A region is a candidate region when according to either the foreground models or the background model the region has some probability of containing a foreground object. The candidate foreground regions 121-122 are input to a validator 200 whose output is a final set of foreground regions 140 that include the objects in $I_t$.

The validator determines the final set of foreground regions through a combination of merging candidate foreground regions 121-122 and applying one or more cues to identify and remove false positive foreground regions. The final set of foreground regions can be fed back (FB) 141 to update the background model and the foreground model before the next image is processed.

The steps of the above method can be performed in a processor connected to memory and input/output interfaces as known in the art. The processor can be embedded in the device 150 to form a self contained system that can be sold to a customer as a single unit, ready to operate and perform the functions of the mention when installed in an environment, such as a room.

Method Details

In greater detail, our method works as follows. The background model and the foreground models are updated as the images are processed.

In one embodiment, the background model includes mean color values, such as a triplet of red (R), green (G) and blue (B) color values for each pixel, and a covariance of the color values for each pixel, such as a covariance matrix in the (R, G, B) color space, that describes a distribution over color values for each pixel location. For example, there can be a Gaussian distribution in (R, G, B) space for each pixel.

A stationary camera 151, which may be attached to a device such as a climate control device, appliance, or entertainment device 150, captures a sequence of images (e.g., video frames) of an indoor scene. The method detects and tracks one or more objects 152, such as people, that are moving for some portion of their time in the scene. For each image $I_t$ 101 in the sequence, the background model is used to estimate a probability of each pixel being part of the background. Because a pixel belongs to either the background or a foreground object, the probability that a pixel is foreground is computed by subtracting its probability of being background from 1. The probabilities of the pixels being foreground are aggregated and filtered to produce a first set of candidate foreground regions 121, which contains regions that have some probability of containing foreground objects.

In our preferred embodiment, the aggregating and filtering of foreground pixel probabilities is done as follows. The image is partitioned into a grid of rectangular regions. The foreground probabilities of all pixels within a rectangular region are averaged to yield the foreground probability for each rectangular region.

Then, a Markov random field (MRF) is used to filter the rectangular region probabilities to reduce high foreground probabilities in isolated areas and increase low foreground probabilities in areas where the surrounding rectangular regions also have high foreground probabilities.

In one embodiment, the foreground models are initially empty. After an image $I_t$ is processed, regions in the final set of foreground regions are used to generate and update the set of foreground models. In a subsequent frame the set of foreground models is used to detect candidate foreground regions which comprise the second set 122.

There are many possible techniques for modeling foreground objects. In one embodiment, we use templates. Each template is a part of a previously processed image in the sequence that belongs to a foreground region. The location in an image at which each template best matches is used to estimate the candidate foreground regions in the second set 122.

The two independent sets of candidate foreground regions, the recent images, and the current background model are all used as input to the validator to produce the set of foreground regions likely containing foreground objects.

The validator uses one or more of the following cues to identify and remove false positive foreground regions.

Object Identity—Each object currently or previously tracked is represented by an identity model. A set of stored identity models can be useful to disambiguate false positive foreground regions from true foreground regions in some challenging situations. For example, if a candidate foreground region does not match any existing track (is not in the second set of candidate foreground regions) and is not moving, then the region could be a false positive foreground region (such as a pillow that was moved on a couch). Alternatively, it could be an object that was being tracked, became occluded, and then became visible again while it was stationary. In this latter case, the candidate foreground region matches a stored identity model 237 and we want to continue tracking the object. The identity models can be the same as the foreground models, but do not have to be. For example, an identity model for a foreground object can be based on a histogram of color values, or on a representative set of subregions used to identify the object.

Object Motion Energy—The motion energy of a candidate foreground region can be determined 235 from a difference image between the candidate foreground region in the current image and the same region in previous images. For example, the motion energy can be computed as a sum over the pixels in the candidate foreground region of a magnitude of a difference image. The difference image can be determined using the recent images 110. The amount of motion energy of new candidate foreground regions, i.e., regions not matching existing foreground models, provides evidence for classifying each region. High motion energy is evidence for a foreground object, while low motion energy is evidence for a false positive region.

Object Motion—if the candidate foreground region is moving over time, then the region is probably a foreground object.

Correlation with Background—If a candidate foreground region in the current frame has high correlation with an image representing the background model (e.g., a mean background image 201, which is formed using the mean value of the Gaussian distribution for each pixel in the background model), then the candidate foreground region is likely to be a false positive region, which the background model falsely identified as foreground due to, e.g., a change in lighting, shadows, or small camera motions such as due to vibration. To measure the correlation between a candidate foreground region and the corresponding region of the representative background image, normalized cross-correlation may be used, for example. In addition, the position of the candidate foreground region may be shifted by multiple small offsets and the correlation with the corresponding region in the representative background image computed for each offset, with the maximum correlation retained as the final correlation score. This process enables small camera movements to be handled.

Object Size—Many false positive foreground regions are very small. If there is a minimum size for an object region, then many candidate foreground regions can be discarded as false positive foreground regions simply because they are too small 210.

Validator

FIG. 2 shows a block diagram of the validator 200 in one embodiment. For each candidate foreground region 205 in the first set 121, the size of the region is checked 210. If the candidate foreground region is too small, then the region is identified as a false positive foreground region and removed 240.

If the candidate foreground region 205 is sufficiently large, then the region is compared with all candidate foreground regions in the second set 122. If the candidate foreground region in the first set does not have a large overlap 220 with any of the regions in the second set, then the candidate foreground region is either a new object that has entered the scene (that was not tracked before), or a false-positive foreground region.

To determine which of these two possibilities is most likely, we compute the correlation 230 between the candidate foreground region 205 and the mean background image 201. If the correlation is low, then we check whether the candidate foreground region matches a stored identity. If so, then the candidate foreground region is added to the final set of foreground regions 140. If the correlation is high, or if the correlation is low but the region does not match any stored identity, then an amount of motion energy within the region is checked 235. This is done by determining the difference image using the recent images 110.

Moving objects tend to have large magnitudes in the difference image. If the candidate foreground region has a low motion energy 235, as well as high correlation with the mean background, then the region is classified as a false positive foreground region and removed 240. The following test can be used to determine whether the candidate foreground region has sufficient motion energy to be classified as a foreground object:

$$\underset{i=t-k,\ldots,t}{median}\left(\sum_{j\in BB(region)}\sum_{c\in(R,G,B)} s(|I_c^i(j) - I_c^{i-1}(j)| - \tau)\right) > q \cdot area[BB(region)],$$

where t is a time index of the current image, k is a number of recent camera images stored in the buffer (e.g., 10), $I_c^i(j)$ is a value of color channel c of pixel j of the image acquired at time index i, $\tau$ is a predetermined threshold value, s is a step function that has a value 1 when the argument is greater than zero and a value of 0 otherwise, q is a predetermined ratio whose value is between 0 and 1, BB(region) a smallest rectangular bounding box that contains the candidate foreground region, and area[BB(region)] is a number of pixels in the bounding box.

If candidate foreground region 205 in the first set does have large overlap with a candidate foreground region in the second set 122, then the two overlapping candidate foreground regions are merged 250. This is done by locating a smallest bounding box that encloses both of the foreground regions being merged.

Next, the foreground pixels in the merged bounding box are eroded and then dilated, using conventional image processing operations. This has the effect of removing isolated foreground pixels and then filling in holes in the middle of remaining foreground regions. After erosion and dilation, the connected components of the foreground pixels in the merged region are computed. This is done because sometimes merged regions include two separate objects that are close together, which should remain separated. Therefore, we check to see whether the merged foreground region has two or more connected components.

The largest connected component 270 found is added 280 to the final set of foreground regions 140 if the region is large enough 210, or classified as a false positive region 240 and removed 245 if not. Each of the other, smaller connected components (if any) are checked for correlation with the mean background image 230 and for motion energy 235, as described above, and is either added 280 to the final set of foreground regions 140 or classified as a false positive foreground region and removed 240.

As shown in FIG. 1, the final (validated) foreground regions that were found in image $I_t$ 140 are fed back (FB) 141 to update the background model and foreground models for use in a subsequent image. In some embodiments, each pixel that is not contained in any region in the final set of foreground regions is classified as background, and its color values in $I_t$ are used to update the background model for that pixel. Likewise, a foreground model can be created or updated for each region in the final set of foreground regions in $I_t$ 140. The final set of foreground regions is also used to update the set of identity models for use in a subsequent image.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting and tracking objects in a sequence of images of a scene acquired by a stationary camera, comprising for each image in the sequence the steps of:
    determining a first set of candidate foreground regions according to a background model;
    determining a second set of candidate foreground regions according to a set of foreground models; and
    validating the candidate foreground regions in the first set and the second set to produce a final set of foreground regions in the image that include the objects present in the image, wherein the validating uses amounts of overlap between regions from the first set and the second set and uses all of the following cues to produce the final set of foreground regions: object identity, object size, object motion energy, and correlation with a representative background image, such as a mean background image, wherein object motion energy is determined using a difference image determined from recent images from the sequence, and wherein the steps are performed in a processor.

2. The method of claim 1, further comprising:
    updating the background model according to the final set of foreground regions.

3. The method of claim 1, further comprising:
    updating the foreground models according to the final set of foreground regions.

4. The method of claim 1, wherein the image is subject to one or more of the following, changing lighting conditions, shadows, occlusion, small camera motions such as caused by vibration, moved background objects, and left-behind objects.

5. The method of claim 1, wherein recent images from the sequence are stored in a buffer.

6. The method of claim 1, wherein the background model includes mean color values and a covariance of color values for each pixel in the image.

7. The method of claim 1, wherein the background model includes a Gaussian distribution of color values for each pixel in the image.

8. The method of claim 1, wherein according to the background model, each pixel in the image has an associated probability of being part of the foreground, and further comprising:
    aggregating and filtering the probabilities to determine the first set of candidate foreground regions.

9. The method of claim 8, wherein the filtering uses a Markov random field.

10. The method of claim 1, wherein an object identity is represented using a histogram of color values of pixels associated with the object.

11. The method of claim 1, wherein the scene is indoors.

12. The method of claim 1, wherein the camera and the processor are located in a climate control device.

13. The method of claim 12, wherein the final set of foreground regions is used to control the climate control device.

14. The method of claim 1, wherein the camera is located in an appliance.

15. The method of claim 14, wherein the final set of foreground regions is used to control the appliance.

16. The method of claim 1, wherein the camera is located in an entertainment device.

17. The method of claim 16, wherein the final set of foreground regions is used to control the entertainment device.

18. The method of claim 1, wherein the camera is located in a device or appliance and the final set of foreground regions is used to control a different device or appliance.

* * * * *